Nov. 6, 1928.　　　J. W. WELSH　　　1,690,605

OPHTHALMIC MOUNTING

Filed April 16, 1925

INVENTOR
James W. Welsh
by David Rines
ATTORNEY

Patented Nov. 6, 1928.

1,690,605

UNITED STATES PATENT OFFICE.

JAMES WILSON WELSH, OF PROVIDENCE, RHODE ISLAND, ASSIGNOR TO BAUSCH AND LOMB OPTICAL COMPANY, OF ROCHESTER, NEW YORK, A CORPORATION OF NEW YORK.

OPHTHALMIC MOUNTING.

Application filed April 16, 1925. Serial No. 23,440.

The present invention, though having also other fields of usefulness, relates more particularly to ophthalmic mountings and methods of making the same. From a more limited aspect, the invention relates to ophthalmic mountings comprising endless, circular lens-holding rims, and more particularly to mountings of the all-"shell" type, constituted of non-metal material, like celluloid, zylonite and the like.

A source of difficulty with ophthalmic mountings the lens-receiving grooves of which are circular is that the lenses tend to rotate in their grooves. A number of proposals have been made to prevent this rotation, many of which have had to do with a metal member projecting from the wall of the groove and into engagement with a notch provided in the periphery of the lens. The projection thus locks the lens against rotation. Some proposals have had to do with a permanently embedded metal member; and others with a removable member. The former has been found to be commercially impractical; and removal metal members, though answering the requirements well, have been found, sometimes, to project too far into the lens-receiving groove, and, at other times, not far enough. In either case, the task of the optician who inserts the lenses in their grooves has been made, by so much, the more difficult.

A chief object of the present invention is to improve upon lens locks of the above-described character. Other and further objects will be explained hereinafter and will be particularly pointed out in the appended claims.

According to the present invention, the optician is enabled to determine for himself just how far the lens-locking member shall project from the wall of the lens-receiving groove. He is thus freed from the arbitrary caprice of the manufacturer who supplies him with the ophthalmic mountings. Not only this, but the optician may permanently secure the lens-lock in just the desired position, and projecting neither too far from nor too near to the wall of the lens-receiving grove. The advantages of a removable locking member are thus combined with those of the permanently embedded member, without the disadvantages of either.

Figure 1:
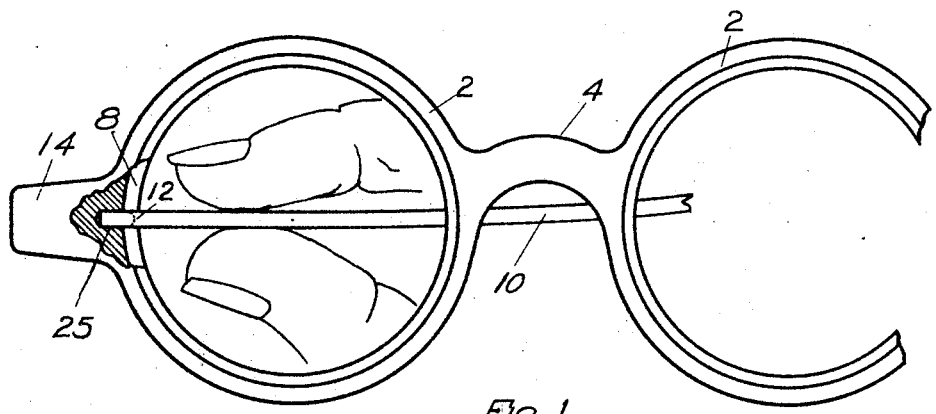
Figure 2:
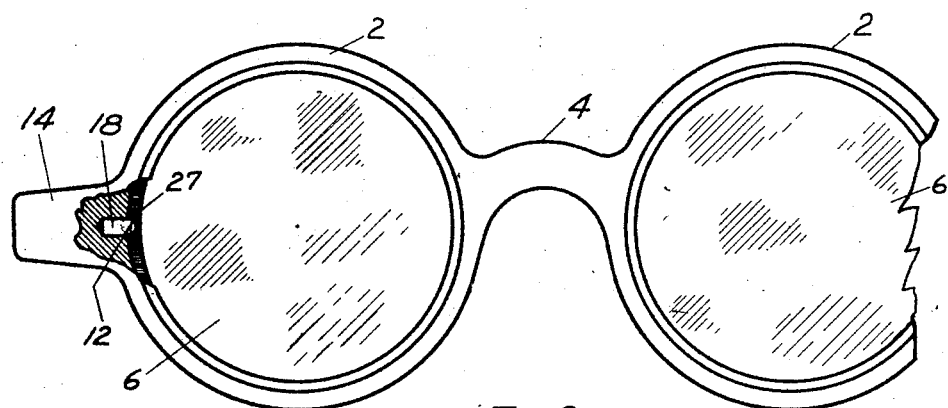

The invention will be explained in connection with the accompanying drawings in which Fig. 1 is a fragmentary elevation, partly in section, of an ophthalmic mounting, illustrating a step in the preferred method of the present invention; and Fig. 2 is a similar view illustrating the ophthalmic mounting of the present invention in its preferred form.

Ophthalmic mountings of the above-described character, constituted of non-metal material, like celluloid, zylonite and the like, comprise two endless rims 2 integrally connected together by a bridge 4, and each having integral temple end pieces 14. The bridge and the end pieces need not, however, be integral. They may be made of metal or other material and they may be attached to the rims in any well-known manner.

The lens-receiving grooves 8 of the rims 2 are generally circular, as shown. Lenses 6 mounted in such grooves have a tendency to turn. This tendency exists even when the rims are not, strictly, circular. To prevent the rotation of the lens, the mountings have been provided with members 18, projecting from the walls of the grooves 8 and into a notch 27 in the lens. These members 18 have been of metal. Their defects and limitations have been mentioned above.

According to the present invention, the lens-receiving groove 8 is provided with a cylindrical notch 25, positioned preferably near the end piece 14. The mounting is supplied to the optician already provided with these notches 25, one in each rim. The notches 25 may be made by drilling, or in any other desired way. If the patient requires a spherical lens, the rotation of which is not harmful, the notch 25 is disregarded, and the lens is mounted in position as though the groove 8 were not provided with the notch 25. In cases where the patient requires a type of lens that must be fixed against rotation, however, the optician, after notching the lens at 27 so as to register with the notch 25 in the mounting, inserts the end of a cylindrical rod 10 into the notch 25 and cuts it off at 12, so that the cut portion shall project beyond the walls of the groove 8 just the right distance so as to enter the notch 27, and not too far or too little. The optician may thus make the notch 27 of such dimension as hardly to be noticeable, when the mounting is worn on the face; and he may make the projection 18 just fit the notch 27.

It is preferred to have the rod 10 constituted of the same non-metal material as the material of the mounting, like celluloid, zylonite and the like. The material is very easily cut at 12; and there is the further advantage that the plug 18 may be integrally connected to the material of the mounting. The plug may, for example, be cemented rigidly in place in the notch 25 if the end of the rod 10 is dipped in a suitable solvent, like acetone, before it is positioned in the notch 25.

The dimensions may be varied in accordance with conditions; but it is found that a very effective lens-lock may be produced,— the locking plug 18 and notch 27 of which are hardly noticeable—by having the plug 18 extend about two millimeters. The diameter of the notch may be about six hundredths of an inch.

It will be understood that the invention is not restricted to the exact embodiment thereof that is illustrated in the accompanying drawings and described herein, and that all modifications within the skill of the artisan are considered to be within the spirit and scope of the present invention, as defined in the appended claims.

What is claimed is:

1. An ophthalmic mounting having a lens-receiving groove provided with a notch, the walls of the groove and of the notch comprising non-metal material, and a non-metal member rigidly seated in the notch and rigidly united with the non-metal material, the non-metal member projecting from the wall of the groove and being adapted to engage a lens.

2. A method of providing with a lens lock an ophthalmic mounting having a lens-receiving groove that comprises notching the wall of the groove, inserting a member in the notch, and cutting the member at a point such that the portion of the member projecting from the recess will be adapted to act as a lens lock.

3. A method of providing with a lens lock an ophthalmic mounting having a lens-receiving groove, the wall of which comprises non-metal material, the said method comprising notching the wall of the groove, inserting a non-metal member in the notch, and integrally uniting the member with the non-metal material, the member projecting from the wall of the groove and being adapted to engage a lens.

4. A method of providing with a lens lock an ophthalmic mounting having a lens-receiving groove the wall of which comprises non-metal material, the said method comprising notching the wall of the groove, inserting a non-metal member in the notch, cutting the member at a point such that the portion of the member projecting from the notch will be adapted to act as a lens lock, and integrally uniting the member with the non-metal material.

In testimony whereof, I have hereunto subscribed my name.

JAMES W. WELSH.